No. 817,902. PATENTED APR. 17, 1906.
C. E. BUNKER.
REFLECTOR FOR MAGNIFYING GLASSES.
APPLICATION FILED APR. 20, 1904.

Witnesses
E. F. Stewart
F. A. Elmore

Carey E. Bunker, Inventor.
by C. A. Snow & Co.
Attorneys

UNITED STATES PATENT OFFICE.

CAREY E. BUNKER, OF OREGON, MISSOURI.

REFLECTOR FOR MAGNIFYING-GLASSES.

No. 817,902.     Specification of Letters Patent.     Patented April 17, 1906.

Application filed April 20, 1904. Serial No. 204,116.

*To all whom it may concern:*

Be it known that I, CAREY E. BUNKER, a citizen of the United States, residing at Oregon, in the county of Holt and State of Missouri, have invented a new and useful Reflector for Magnifying-Glasses, of which the following is a specification.

My invention relates to magnifying-glasses, and especially to monocular glasses employed by jewelers, and has for its objects to provide said devices with a simple reflector adapted in practice to concentrate and direct light-rays upon the object under inspection, one in which the reflector will be disposed at an angle to the lens to thus receive the light from an angular point relative to the glass and direct or focus it to a point in line with the focal point of the lens, one in which the focal point of the reflector will lie in advance of the focal point of the lens, thereby insuring a strong light being thrown upon the object under inspection, and one in which the angular position of the reflector relative to the lens may be varied or adjusted to accord with the angular position of the source of light relative to the glass.

With these and other objects in view the invention comprises the novel features of construction and combination of parts more fully hereinafter described.

Figure 1:
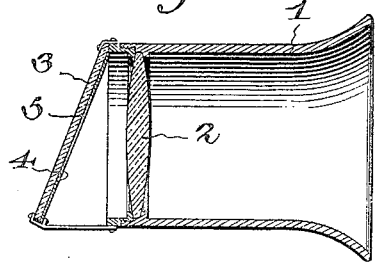
Figure 3:
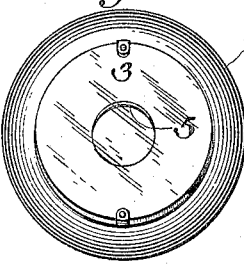
Figure 2:
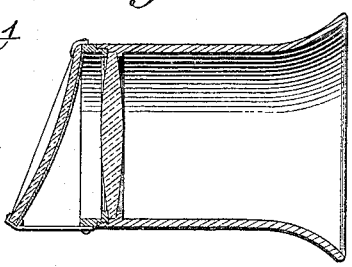
Figure 5:
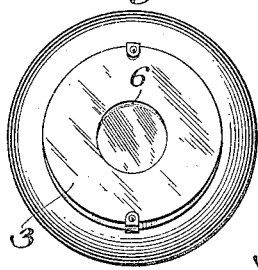
Figure 4:
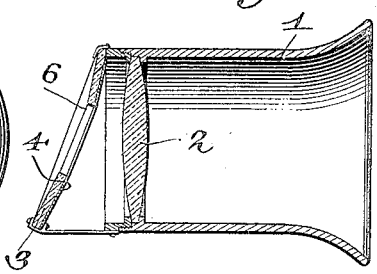
Figure 6:
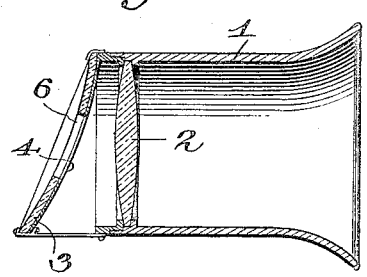
Figure 7:
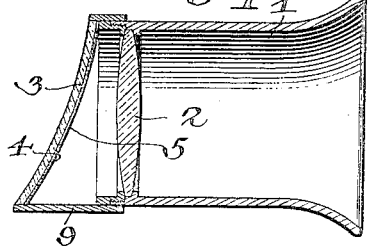

In the accompanying drawings, Figure 1 is a side sectional elevation illustrative of one form of embodiment of the invention. Fig. 2 is a similar view of another form of the invention. Fig. 3 is a front elevation of Fig. 2. Fig. 4 is a side sectional elevation of another form of the device. Fig. 5 is a front view of the form of device shown in Fig. 4. Fig. 6 is a view similar to Fig. 4 of a slightly-modified form. Fig. 7 is a view in vertical longitudinal section through a magnifying-glass, showing a slightly-modified form of reflector.

Referring to the drawings, 1 designates the case of the glass, and 2 the lens seated and fixed in the forward end thereof, these parts being of the usual construction and material and adapted for use in the ordinary manner.

Attached to the forward end of the case 1 and in advance of the lens 2 is a reflector 3, having a highly-polished light-reflecting surface, said reflector being preferably composed of glass having applied to its rear or inner face a coating of quicksilver, as in the ordinary method of preparing mirrors.

In Fig. 1 I have illustrated the reflector as having a plano surface, to which the coating 4 of silver is applied in the form of an annular marginal band, thereby leaving free from coating, and consequently transparent, a central circular portion 5, constituting a sight-opening, while in Figs. 2 and 3 the reflector is similarly prepared, but is slightly concaved and arranged with its concaved face outward.

In Figs. 4 and 5 the reflector, which is composed of glass prepared as above described, has inwardly-inclined or convergent plano surfaces and is perforated at its center, as at 6, to produce the central circular sight-opening, while in Fig. 6 is shown a reflector identical with that of Fig. 4, except that the reflector is slightly concaved, as in the form shown in Fig. 2.

Attention is here directed to the fact that in all of the above-described forms of the device the reflector, although fixed in any suitable manner to the case, is disposed at an angle relative to the lens 2, whereby angular light-rays derived from a source of light disposed at an angle relative to the glass, as seen in Fig. 10, will be received by the reflector and directed and concentrated upon a point or focus in line with the focal point of the lens. It may be said that in using a glass such as herein described it is customary and, in fact, proper to keep both eyes open and that by arranging the reflector at an inclination relative to the lens the vision of the inactive eye, or that which does not hold the glass, may be directed away from the source of light to thus obviate injury to the optic, while at the same time the operator may assume the usual and comfortable position while inspecting an object. It is also to be noted that the focal point of the reflector is disposed, preferably, in advance of the focal point of the lens, whereby in directing the light upon an object—say, for example, upon the interior of a watch—a sufficiently clear, strong, and diffused light will be obtained to insure free inspection of the object without the presence of shadows, although it is to be understood that the focal point of the reflector may in some instances fall in rear of the focal point of the lens.

In Fig. 7 I have shown a reflector similar to that illustrated in Fig. 2, but carried by a cap 9, composed from sheet metal or other suitable material and adapted to seat upon the forward end of the case 1, it being understood, of course, that, if desired, the cap may be in threaded engagement with the case.

From the foregoing it is apparent that I produce a simple device admirably adapted for the attainment of the ends in view, it being understood that minor changes in the details herein set forth may be resorted to without departing from the spirit of the invention. For example, while I have herein shown and described the device as applied to a monocular glass adapted for jewelers' or watchmakers' use, the same may of course be applied to binocular or other glasses if desired, or the general form of the reflector and of the reflecting-surface may be varied at will within the scope of my invention.

Having thus described the invention, what is claimed is—

1. The combination with the eyepiece of a monocular magnifying-glass, of a reflector held frictionally combined therewith and comprising a tubular ungulaform holder, and a reflecting-surface disposed at the oblique side of the holder and having its center permeable by light.

2. The combination with the eyepiece of a monocular magnifying-glass, of a reflector held frictionally combined therewith and comprising a tubular ungulaform holder of substantially the same cross-diameter from end to end, and a reflecting-surface disposed at the oblique side of the holder and having its center permeable by light.

3. The combination with the eyepiece of a monocular magnifying-glass, of a reflector held frictionally combined therewith and adjustable relatively thereto, and comprising a tubular ungulaform holder, and a reflecting-surface disposed at the oblique side of the holder and having its center permeable by light.

In testimony that I claim the foregoing as my own I have hereto affixed my signature in the presence of two witnesses.

CAREY E. BUNKER.

Witnesses:
   C. W. KING,
   C. J. BUNKER.